United States Patent
Le Docte

(10) Patent No.: US 11,624,296 B2
(45) Date of Patent: Apr. 11, 2023

(54) ANTI-FIRE DEVICE FOR CLOSING SPACES AT JOINTS OF A NACELLE AND NACELLE COMPRISING SUCH A DEVICE

(71) Applicant: Safran Nacelles, Gonfreville l'Orcher (FR)

(72) Inventor: Thierry Le Docte, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 741 days.

(21) Appl. No.: 16/548,054

(22) Filed: Aug. 22, 2019

(65) Prior Publication Data

US 2020/0063602 A1 Feb. 27, 2020

(30) Foreign Application Priority Data

Aug. 22, 2018 (FR) ..................... 18/57584

(51) Int. Cl.
| | | |
|---|---|---|
| B64C 27/00 | (2006.01) | |
| F01D 25/24 | (2006.01) | |
| F16J 15/06 | (2006.01) | |
| F16J 15/08 | (2006.01) | |
| F16J 15/10 | (2006.01) | |

(52) U.S. Cl.
CPC ............ *F01D 25/24* (2013.01); *F16J 15/065* (2013.01); *F16J 15/0806* (2013.01); *F16J 15/104* (2013.01); *F05D 2220/323* (2013.01); *F05D 2300/133* (2013.01)

(58) Field of Classification Search
CPC .. B64C 7/00; B64C 7/02; B64D 27/26; B64D 29/00; B64D 45/00; B64D 2045/009; F16J 15/065; F16J 15/0806; F16J 15/104; F05D 2300/222
See application file for complete search history.

(56) References Cited

U.S. PATENT DOCUMENTS

| | | | | |
|---|---|---|---|---|
| 5,910,094 | A   * | 6/1999  | Kraft       | F02C 7/25 60/39.091 |
| 9,175,607 | B2  * | 11/2015 | Welch       | B32B 3/02 |
| 2012/0273299 | A1 * | 11/2012 | Jones    | F01N 1/084 181/228 |
| 2015/0175272 | A1 * | 6/2015  | Brochard | B64D 27/26 244/54 |
| 2015/0233261 | A1 * | 8/2015  | Hodgkinson | F16J 15/0887 277/594 |
| 2018/0156129 | A1 * | 6/2018  | Takeuchi | B64D 29/00 |
| 2018/0156130 | A1 | 6/2018  | Takeuchi | |
| 2018/0156334 | A1 * | 6/2018  | Takeuchi | B64D 45/00 |

FOREIGN PATENT DOCUMENTS

FR 2973467 10/2012

* cited by examiner

*Primary Examiner* — Eldon T Brockman
*Assistant Examiner* — Maxime M Adjagbe
(74) *Attorney, Agent, or Firm* — Burris Law, PLLC

(57) ABSTRACT

A device for sealing a space at a juncture between elements of a nacelle, the device being non-flammable by heat, having a predetermined shape, and having a proximal end configured to be inserted into the space to be sealed so as to seal it, and a distal end configured to be fastened to an element of the nacelle at a fire area.

14 Claims, 5 Drawing Sheets

ANTI-FIRE DEVICE FOR CLOSING SPACES AT JOINTS OF A NACELLE AND NACELLE COMPRISING SUCH A DEVICE

CROSS-REFERENCE TO RELATED APPLICATIONS

This application claims priority to and the benefit of FR 18/57584 filed on Aug. 22, 2018. The disclosure of the above application is incorporated herein by reference.

FIELD

The present disclosure relates to a device configured to seal spaces present at junctures between elements of a turbojet engine nacelle for an aircraft.

BACKGROUND

The statements in this section merely provide background information related to the present disclosure and may not constitute prior art.

An aircraft is propelled by at least one propulsion unit including a turbojet engine housed in a nacelle also accommodating a set of auxiliary devices relating to its operation, such as power transmission gearboxes or turbines, thereby ensuring various functions, when the turbojet engine is in operation or stopped.

A nacelle generally has a tubular structure comprising an air inlet at the front of the turbojet engine, a middle section configured to surround a fan of the turbojet engine, and a rear section configured to surround the combustion chamber of the turbojet engine and able to accommodate thrust reversal.

Modern nacelles are often configured to accommodate a bypass turbojet engine capable of generating, with the blades of the rotating fan and a compressor, a hot air flow, called primary air flow, coming from the combustion chamber of the turbojet engine and from high pressure/low pressure turbines disposed downstream of the compression chamber. The compressor, combustion chamber and turbines assembly constitutes the gas generator of the turbojet engine, also called a core of the turbojet engine.

A nacelle generally comprises an outer structure comprising the air inlet, the middle section and the rear section, and a concentric inner structure of the rear section, called Inner Fixed Structure (IFS), surrounding the core of the turbojet engine behind the fan. These outer and inner structures define an annular flow channel, also called secondary flow path, aiming at channeling a cold air flow, called secondary air flow, which circulates outside the turbojet engine.

The middle section of the nacelle may also be called a fan casing cowl, whereas the rear section may also be called a thrust reverser, or sliding cowl if it is capable of sliding longitudinally.

The rear structure of the core of the turbojet engine terminates in a nozzle called primary nozzle ensuring the ejection of the primary flow of hot air. The outer structure of the nacelle, in turn, generally terminates in a nozzle called secondary nozzle which may have a variable section improving the ejection of the secondary flow of cold air.

The inner structure of the nacelle thus constitutes a cowling around the core of the turbojet engine and may be designated by different names, in particular Aft Core Cowl (ACC).

The auxiliary devices, such as power transmission gearboxes or turbines, can cause fires. They are housed in volumes of the nacelle called "fire areas". Thus, the walls of these fire areas must withstand a fire and be tight. These walls may be made of several joined elements.

Spaces are generally present at the junctures between these different elements. They allow ensuring the clearance required for the assembly of the auxiliary devices in the nacelle.

It is desired to fill these spaces, after assembly, in order to make a fireproof barrier.

Usually, these spaces are sealed by application of fire-resistant mastic.

A mastic is a plastic paste obtained by mixing different synthetic or natural substances, so as to confer to it the desired mechanical properties. The mastic generally used to make a fireproof barrier at junctures between elements of a nacelle is composed of several polymers vulcanizing in the presence of humid air.

This paste is applied at the junctures, then it polymerizes so as to seal the spaces and make a fluid-tight and flame-resistant barrier.

The mastic is suitable for filling spaces subjected to any pressure value, and in particular spaces subjected to pressures higher than 35 mbar.

Although the mastic is not flammable when in contact with fire, it expands and liquefies in contact with heat, and migrates outside the fire area. Gas, produced by the degradation of the mastic, is then emitted outside of the fire area where it can be ignited in contact with the air and with the walls heated by the flames.

Another known solution for making fireproof barriers at junctures of nacelle elements is presented in the document FR 2 973 439. This solution consists in applying a sealing gasket set comprising a first end equipped for fastening on at least one first element, a second end designed to come into contact against a bearing area of a second structure, and a plurality of adjacent metal lamellae or lamellae made of a composite material, arranged between the first and second ends, having an accordion-like structure so that it is deformable.

This type of sealing gasket set has a complex structure and therefore generates high manufacturing costs.

Furthermore, this type of gasket has a deformable structure necessary at the juncture between some elements having relative displacements, but unnecessary at the juncture between elements having no relative displacements.

SUMMARY

In order to fill the spaces at junctures between elements having no or little relative displacements, a new type of gasket whose structure is simplified so as to limit the manufacturing costs is provided, and which allows making an improved fireproof barrier, by avoiding or limiting the application of mastic.

To this end, the present disclosure relates to a device for sealing a space at a juncture between elements of a nacelle, characterized in that it is non-flammable by heat, and in that it has a predetermined shape.

Thus, the device according to the teachings of the present disclosure improves fireproof barriers at the junctures between elements constituting a fireproof wall of a nacelle.

As used herein, the term "space" refers to an area where different parts or elements of the nacelle meet each other, leaving a clearance therebetween. The space can have a complex shape.

According to other features of the present disclosure, the device of includes one or more of the following optional features considered alone or according to any possible combination.

The device is advantageously tight under a pressure higher than 35 mbar.

In one form, the device is adapted to seal a space by covering said space.

In another form, the device is adapted to seal a space by the at least partial insertion thereof into said space.

According to a feature of this form, the device advantageously has a proximal end configured to be inserted into the space to be sealed so as to seal it, and a distal end configured to be fastened to an element of the nacelle on the side where the fire is likely to start.

Thus, the proximal end having a predetermined shape allows matching to the shape of the space which is possibly complex. The distal end, cleared off the space, allows fastening the device on an element of the nacelle, in an area where the fire would be likely to start.

In one variation, the device has the shape of a substantially planar plate.

According to one feature, the device has a tip at its proximal end configured to be inserted into a space to be sealed.

According to one feature, the tip is truncated so that the device has a substantially trapezoidal shape.

The device is configured to be fastened on an element of the nacelle by riveting or gluing.

The device advantageously has a thickness increasing from the proximal end to the distal end, for example ranging from 0.1 to 2 mm, such as from 0.4 to 1.6 mm.

Thus, the device is configured to be introduced into a space until its contour is in contact with the walls of said space in order to seal it.

In this way, the same device is capable of filling spaces with different thicknesses and widths.

The device according to the teachings of the present disclosure is made of a metal such as titanium or stainless steel, or of a fibrous composite material, or of an elastomer, such as silicone according to the standard NFL 17 153.

Furthermore, in one form the present disclosure is directed to a nacelle including a device as previously described.

More particularly, in one form the present disclosure is directed to a nacelle including a device as previously described and a non-flammable element when in contact with fire at its contours, such as mastic.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
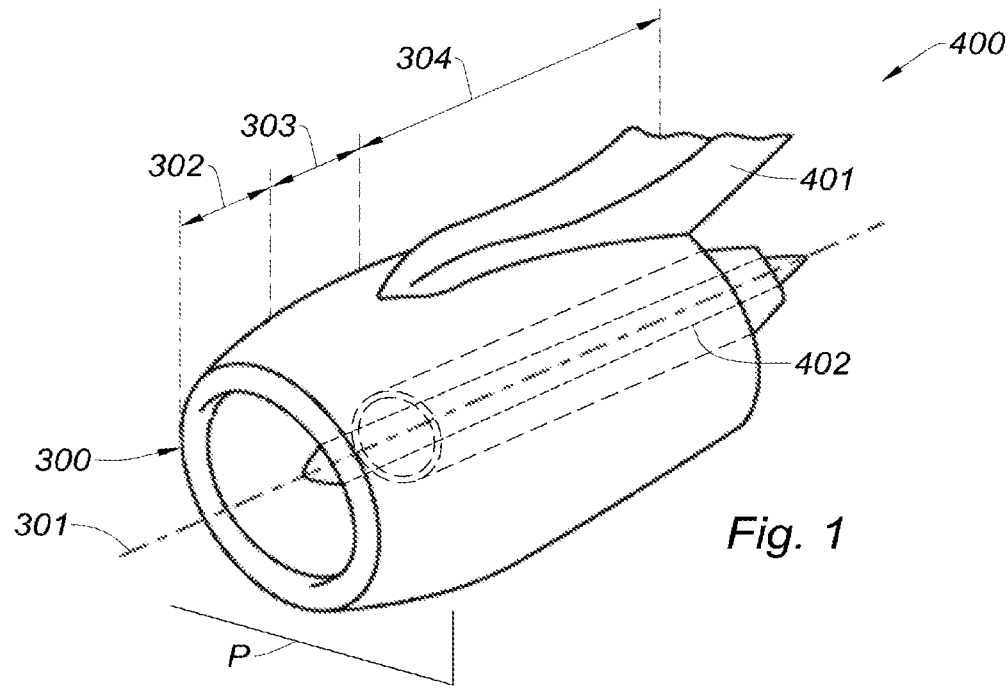
FIG. 1 is a schematic perspective view of a turbojet engine nacelle of an aircraft.

In the following description and in the claims, identical, similar or analogue components will be designated by the same reference numerals and the terms "front", "rear", "horizontal", "vertical", "upper", "lower", etc. will be used in a non-limiting manner and with reference to the drawings in order to facilitate the description.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 represents a propulsion unit 400 of an aircraft configured to be connected to a wing of a mast 401.

The propulsion unit 400 comprises a turbojet engine 402 disposed in a substantially concentric manner in a nacelle 300 which allows channeling an air flow in the direction of the turbojet engine.

For the rest of the description, the longitudinal direction is parallel to the longitudinal axis 301 of the nacelle 300. A longitudinal plane is a plane passing through the longitudinal axis 301 of the nacelle 300 and a transverse plane is a plane perpendicular to the longitudinal direction.

The terms "front" and "rear" refer to the flow direction of the air flow in the nacelle 300. The front corresponds to an area where the air flow enters the nacelle and the rear to an area where the air flow comes out.

The nacelle 300 includes, from front to rear, an air inlet 302, a middle section 303 configured to surround a fan (not represented) of the turbojet engine 402, and a rear section 304 configured to surround the combustion chamber of the turbojet engine 402 and able to accommodate thrust reversal (not represented).

Figure 2:
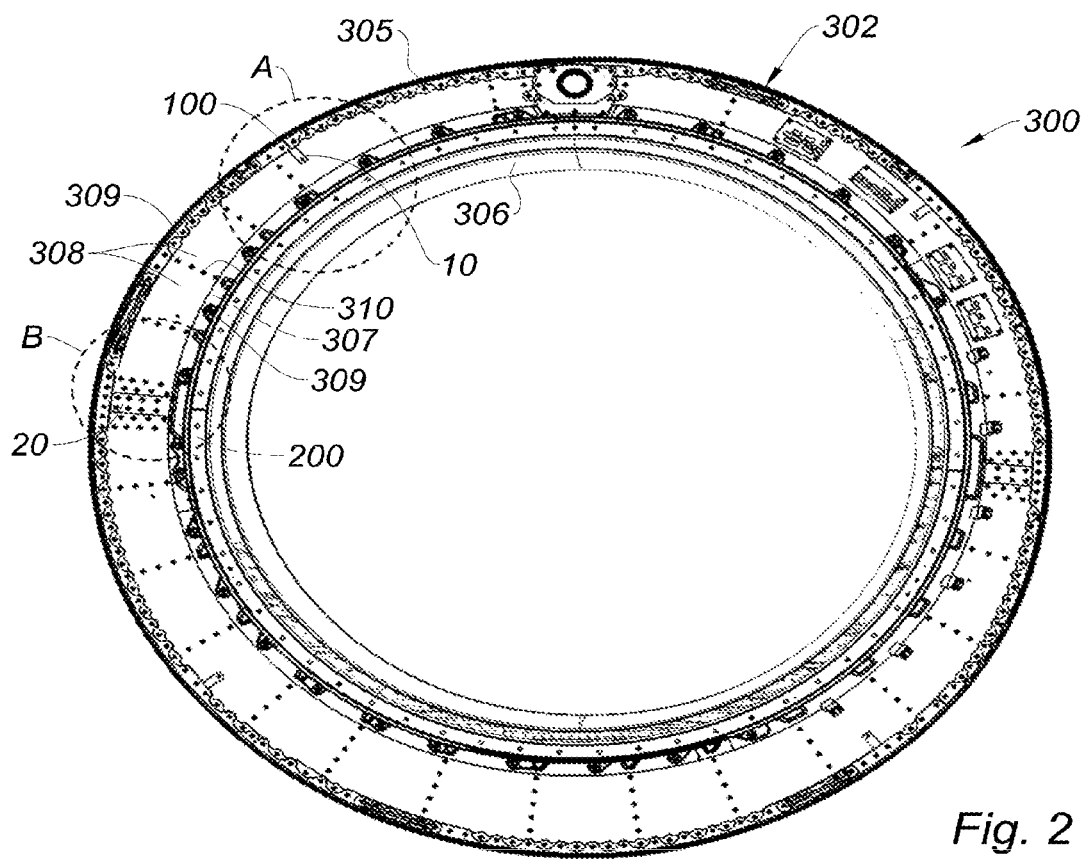
FIG. 2 is a schematic sectional view according to the plane P of the nacelle of FIG. 1, including two variants of the device according to the teachings of the present disclosure, each device sealing a space at a juncture between elements of the nacelle.

FIG. 2 represents a section of the air inlet 302 of the nacelle 300, said air inlet 302 including an outer cowl 305 and an inner cowl 306, said inner cowl 306 including an acoustic panel 307.

Auxiliary devices (not represented) are configured to be disposed in volumes of the air inlet located between the outer cowl 305 and the inner cowl 306.

These volumes are closed by tight walls including fire-resistant metal sheets 308 connected to each other by rivets 310, and connected to the outer cowl 305 and to the acoustic panel 307 by brackets 309.

A first space 100 is present at a juncture between the different elements of the walls, more specifically between brackets 309 and fire-resistant metal sheets 308, at the outer cowl 305.

This first space 100 is sealed by a device 10 for sealing a space according to a first form of the present disclosure.

A second space 200 is present at a juncture between the different elements of the walls, more specifically between brackets 309 connecting fire-resistant metal sheets 308 to the acoustic panel 307.

This second space 200 is sealed by a device 20 for sealing a space according to a second form of the present disclosure.

Figure 3:
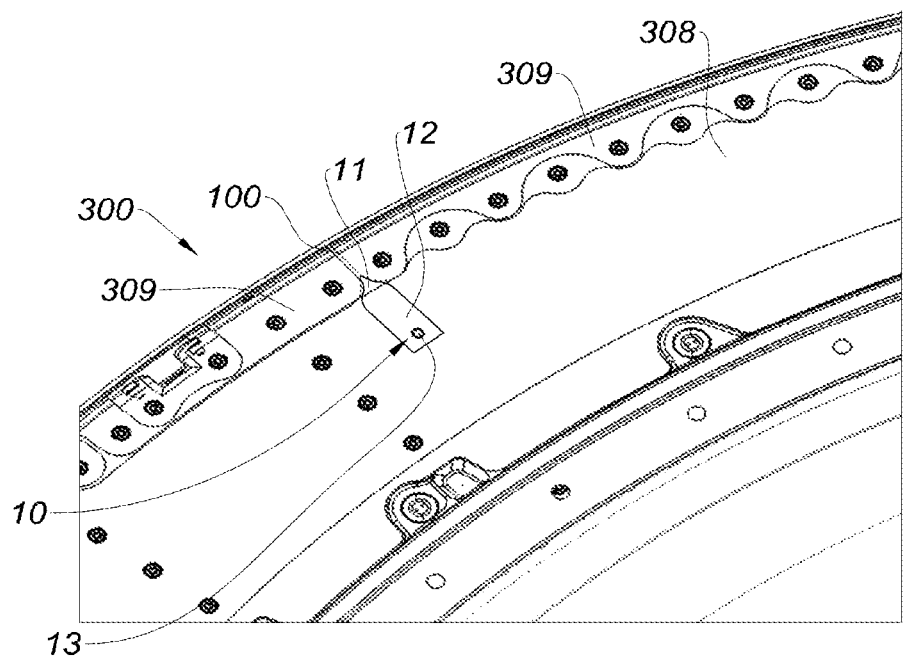
FIG. 3 is a detailed view illustrating the area A of FIG. 2.

FIG. 3 illustrates in more detail the area A of FIG. 2, including the first space 100 sealed by the device 10 according to a first form.

The device 10 has a proximal end 11 inserted into the space 100, and a distal end 12 fastened to the fire-resistant metal sheet 308 by rivets 13.

The device 10 is made of a metal, such as titanium or stainless steel.

Alternatively, the device 10 is made of a composite material such as epoxy carbon.

Thus, the device 10 is non-flammable by heat, and tight even at pressures higher than 35 mbar.

Figure 4A:
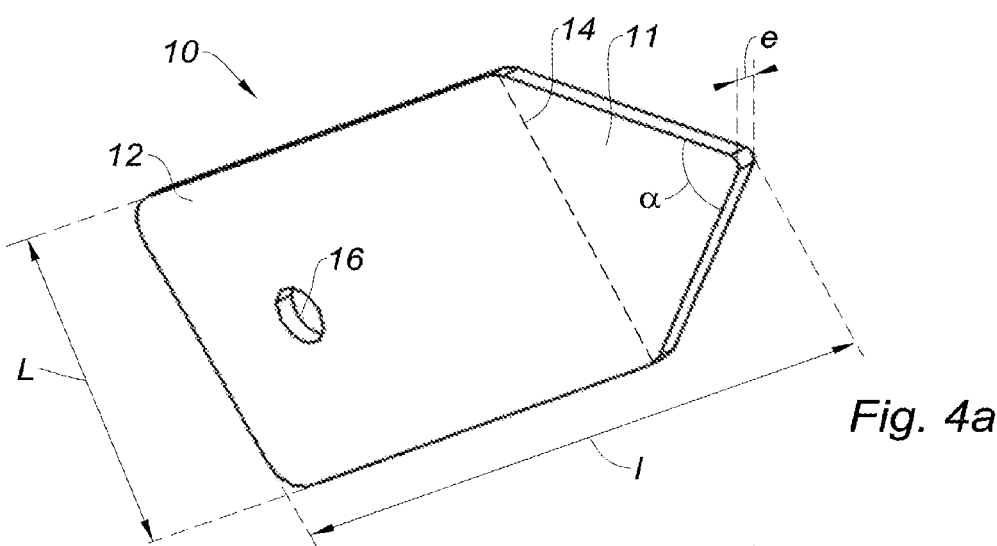
FIGS. 4a and 4b are schematic front perspective views of the device of the area A of FIG. 2, according to two variants.

FIG. 4a illustrates a first variant of the device 10 according to the first form.

The device 10 has the shape of a substantially planar plate with a width "L" comprised between 10 and 20 mm, for example between 15 and 20 mm such as 17 mm; a length "l" comprised between 30 and 60 mm, for example between 40 and 50 mm such as 46 mm; a thickness "e" in the range of 1 mm.

The proximal end 11 of the plate forming the device 10 has the shape of a triangular tip having a base 14 represented in dashed lines in FIG. 4a, and a vertex 15 with an angle α in the range of 60°.

Figure 4B:
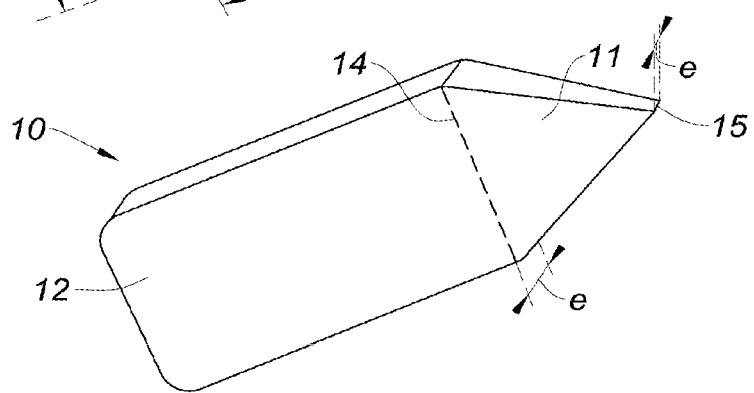

FIG. 4b illustrates a second variant of the device 10 according to the first form.

In this second variant, the device 10 has a thickness "e" increasing from the vertex 15 to the base 14 of the proximal end 11 shaped as a triangular tip.

The thickness "e" ranges from 0.1 to 2 mm, for example from 0.4 to 1.6 mm.

This variable thickness allows filling the spaces whose width is variable.

In non-represented variants, the angle α may be in the range of 20° or 45°.

In other non-represented variants, the tip is truncated so that the proximal end 11 has the shape of a trapezium.

The distal end 12 has the shape of a substantially planar rectangular part whose width L corresponds to the base 14 of the tip forming the proximal end 11.

The rectangular part forming the distal end 12 is coplanar with the triangular tip forming the proximal end 11.

The device 10 includes at its distal end 12 an orifice 16 enabling fastening thereof by riveting.

In a non-represented variant, the device 10 includes several orifices 14 enabling fastening thereof by riveting.

In some variations the device 10 is made in one piece.

Figure 5:
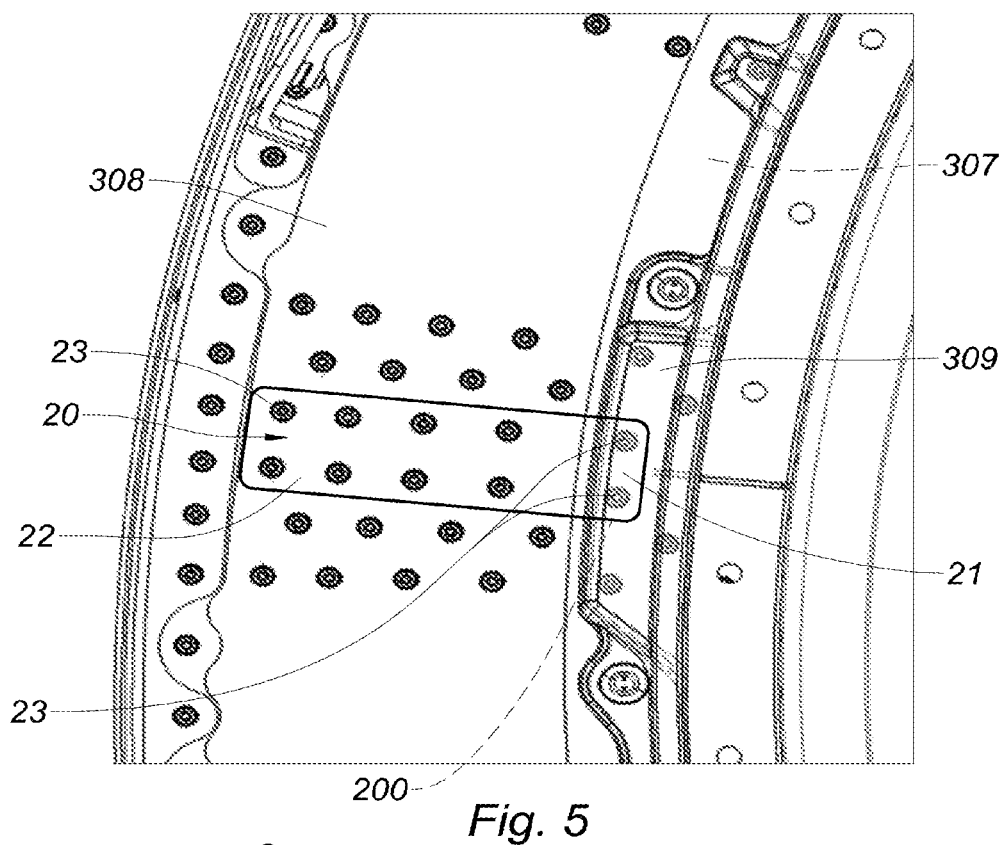
FIG. 5 is a detail view illustrating the area B of FIG. 2.

FIG. 5 illustrates in more detail the area B of FIG. 2, including the second space 200 sealed by the device 20 according to a second form.

The device 20 has a proximal end 21 inserted into the space 200, and a distal end 22 fastened to the fire-resistant metal sheet 308 by rivets 23.

The proximal end 21 is also fastened to the fire-resistant metal sheets 308 and to the brackets 309 connecting the fire-resistant metal sheets 308 to the acoustic panel 307, by rivets 23.

The device 20 is made of a metal, such as titanium or stainless steel.

Alternatively, the device 20 is made of a composite material such as epoxy carbon.

Thus, the device 20 is non-flammable by heat, and tight even at pressures higher than 35 mbar.

Figure 6:
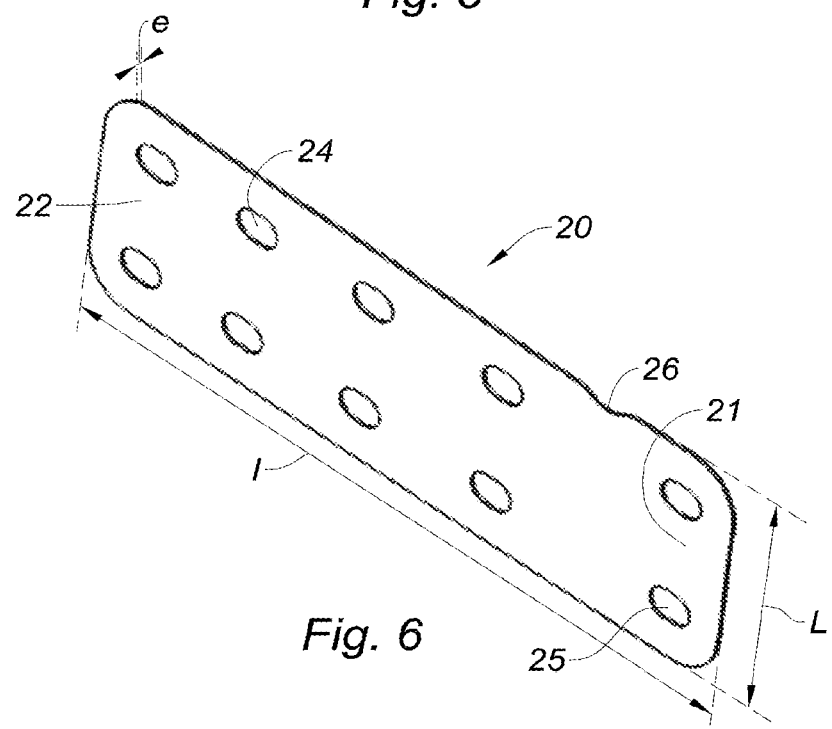
FIG. 6 is a schematic front perspective view of the device of the area B of FIG. 2.

FIG. 6 illustrates the device 20 according to the second form.

The device 20 has the shape of a substantially planar and rectangular plate with a width "L" comprised between 30 and 60 mm, for example between 40 and 50 mm, such as 43 mm; a length "l" comprised between 100 and 160 mm, for example between 130 and 140 mm, such as of 134 mm; and a thickness "e" in the range of 0.5 mm.

The device 20 includes at its distal end 22 oblong orifices 24 enabling a proper positioning and the fastening thereof by riveting.

It further includes at its proximal end 21 holes 25 enabling passage of the rivets 23 (FIG. 5) allowing fastening the fire-resistant metal sheet 308 to the acoustic panel 307.

Moreover, the device 20 includes a trimming 26 enabling passage of a rivet 310 (FIG. 2) allowing fastening fire-resistant metal sheets 308 to each other.

In some variations the device 20 is made in one piece.

Figure 7A:
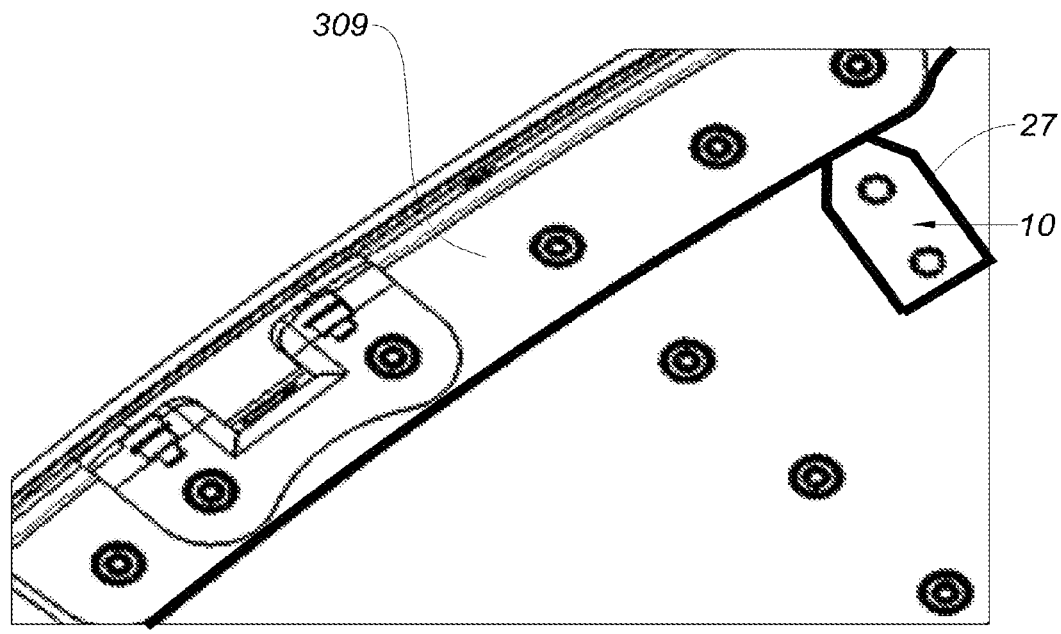
FIG. 7a is a schematic view illustrating a variant of the device according to the teachings of the present disclosure in which the device of FIG. 4a includes a non-flammable element when in contact with fire at the contour thereof.

In the variant represented in FIG. 7a, the device 10 is made of an elastomer, such as silicone according to the standard NFL 17 153.

According to this variant, it includes, when the pressure is higher than 35 mbar, a non-flammable element 27 when in contact with fire, such as mastic, at its contours.

Indeed, the silicone being flammable when in contact with fire, it is advantageous to protect it from fire by a non-flammable material when in contact with fire such as mastic.

The non-flammable element 27 when in contact with fire is also applied at the brackets 309.

The non-flammable element 27 when in contact with fire is applied in amounts smaller than the amounts applied in the prior art.

Indeed, the thickness of the mastic is in the range of 0.4 to 1 mm.

Figure 7B:
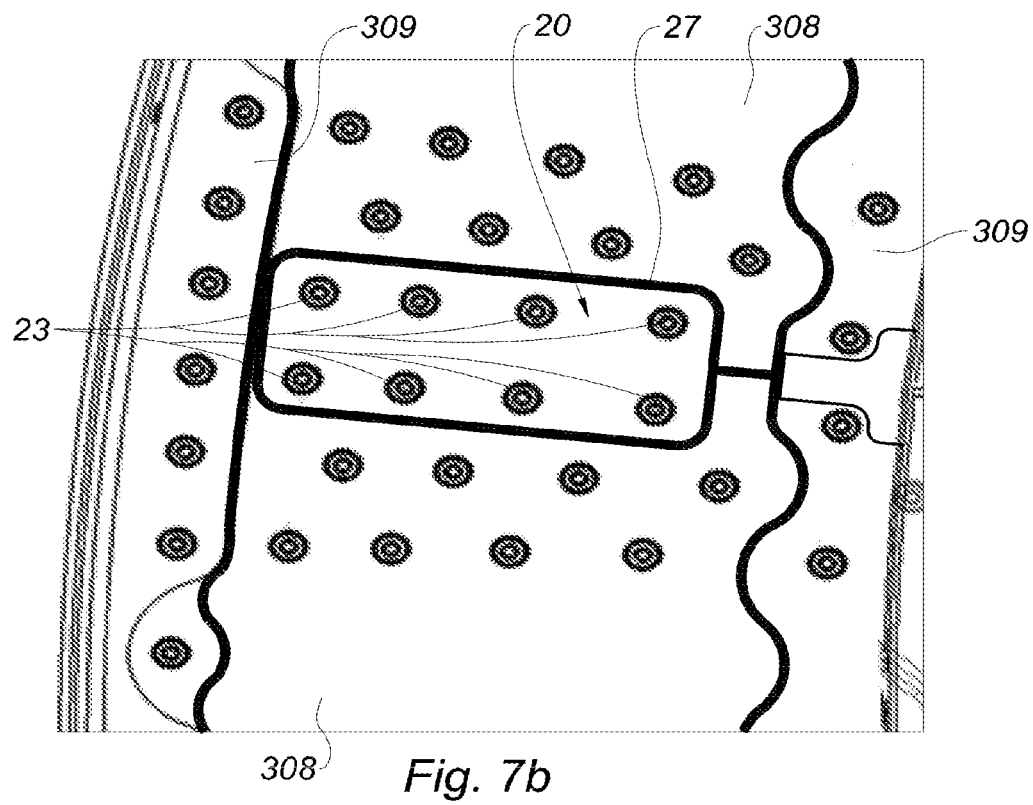
FIG. 7b is a schematic view illustrating a variant of the device according to the teachings of the present disclosure, the device covering a space at a juncture between elements of a nacelle.

FIG. 7b illustrates a space (not represented) present at a juncture between the different elements of the walls, more specifically between fire-resistant metal sheets 308.

This space is sealed by the device 20 as described with reference to FIG. 6, said device covering the orifice (not represented) so as to seal it.

The device 20 is fastened to the fire-resistant metal sheets 308 by rivets 23.

In the example illustrated in FIG. 7b, the device 20 is made of an elastomer, such as silicone according to the standard NFL 17 153 and includes, preferably when the pressure is higher than 35 mbar, a non-flammable element 27 when in contact with fire, such as mastic, at its contours.

The non-flammable element 27 when in contact with fire is also applied at the brackets 309.

The non-flammable element 27 when in contact with fire is applied in amounts smaller than the amounts applied in the prior art.

Indeed, the thickness of the mastic is in the range of 0.4 to 1 mm.

Figure 8A:
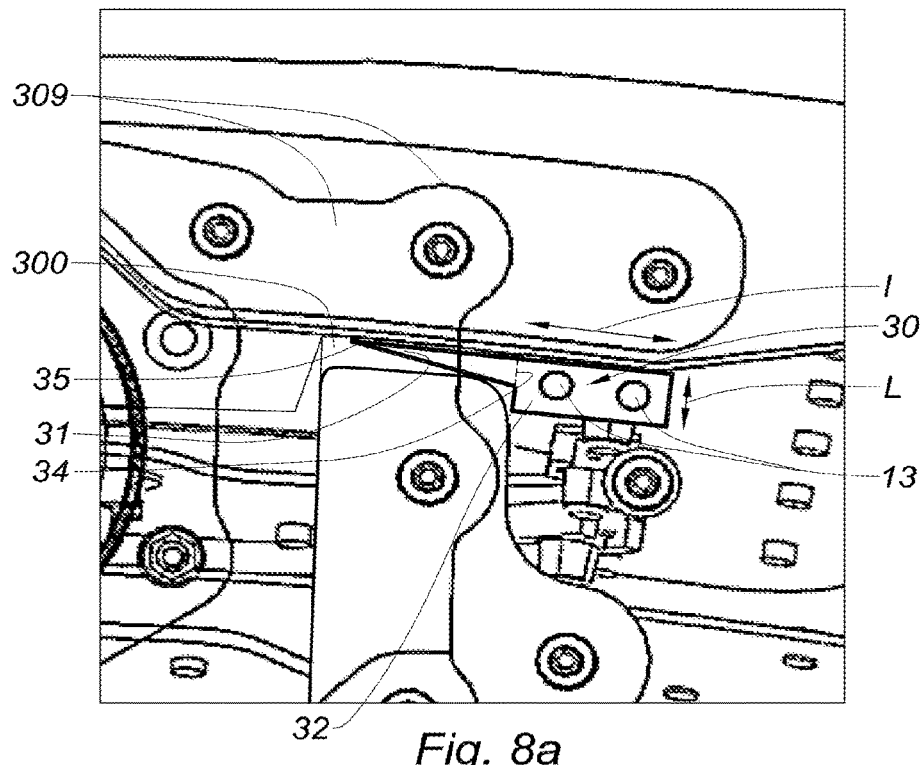
FIGS. 8a and 8b illustrate device variants according to the teachings of the present disclosure in spaces at the junctures between elements of a nacelle.

FIG. 8a illustrates a device 30 according to a third form of the present disclosure inserted into a space 300 at junctures between brackets 309 allowing connecting elements of a nacelle.

The device 30 according to this third form has a proximal end 31 inserted into the space 300, and a distal end 32 fastened to elements of the nacelle by rivets 13.

The device 30 is made of a metal, such as titanium or stainless steel.

Alternatively, the device 30 is made of a composite material such as epoxy carbon.

Thus, the device 30 is non-flammable by heat, and tight even at pressures higher than 35 mbar.

The proximal end 31 in the form of a tip lies in the extension of the length "l" of the device 30, close to an edge.

Figure 8B:
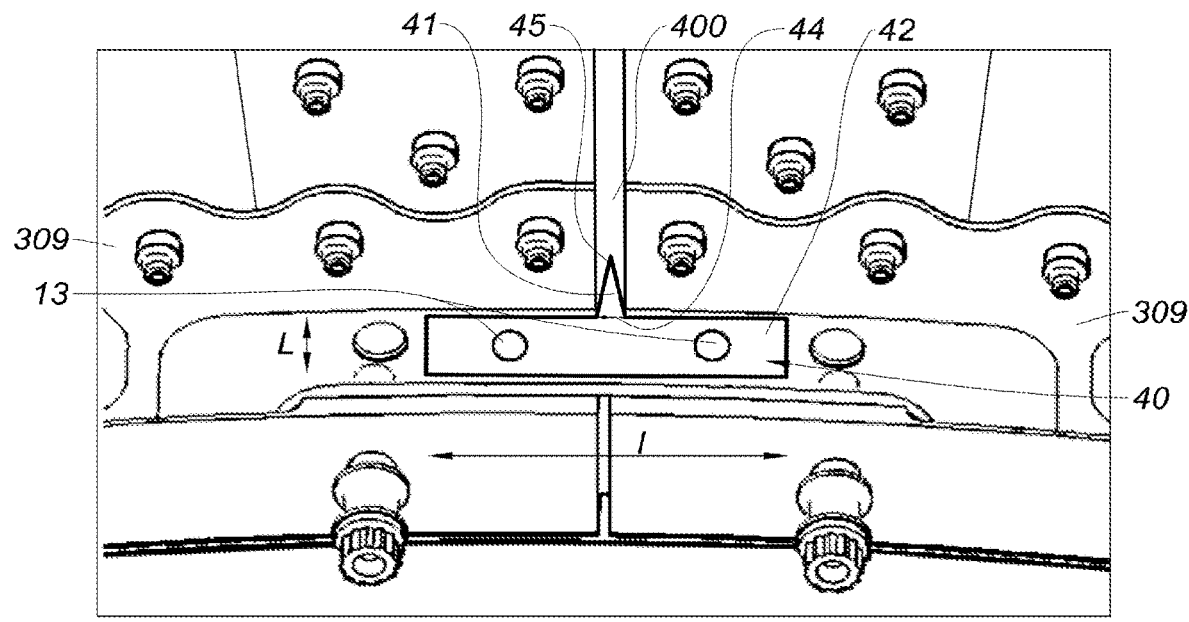

FIG. 8b illustrates a device 40 according to a fourth form of the present disclosure inserted into a space 400 at junctures between brackets 309 allowing connecting elements of a nacelle.

The device 40 according to this fourth form has a proximal end 41 inserted into the space 400, and a distal end 42 fastened to brackets 309 by rivets 13.

The device 40 is made of a metal, such as titanium or stainless steel.

Alternatively, the device 40 is made of a composite material such as epoxy carbon.

Thus, the device 40 is non-flammable by heat, and tight even at pressures higher than 35 mbar.

The proximal end 41 in the form of a tip lies in the extension of the width L of the device 40, substantially at the center of the width L.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

The invention claimed is:

1. A device for sealing a space at a juncture between two or more elements of a nacelle, the device comprising:
   a predetermined shape with a proximal end configured to be inserted into the space between the two or more elements of the nacelle and a distal end configured to be fastened to one of the two or more elements of the nacelle at a fire area,
   wherein the device is non-flammable and has a substantially planar plate shape, and
   wherein the proximal end of the device forms a seal across the space.

2. The device according to claim 1, wherein the device has a tip at the proximal end configured to be inserted into the space to be sealed.

3. The device according to claim 2, wherein the tip is truncated so that the device has a substantially trapezoidal shape.

4. The device according to claim 1, wherein the distal end is configured to be fastened on the one of the two or more elements of the nacelle by riveting or gluing.

5. The device according to claim 1, wherein the predetermined shape has an increase in thickness from the proximal end to the distal end.

6. The device according to claim 1, wherein the device is made of at least one of a metal or a fibrous composite material.

7. The device according to claim 1, wherein the device is made of an elastomer.

8. A nacelle including the device according to claim 7 and a non-flammable element, wherein the non-flammable element is non-flammable when in contact with fire at its contours.

9. The nacelle according to claim 8 wherein the non-flammable element is mastic.

10. A nacelle including the device according to claim 1.

11. The device according to claim 1, wherein the predetermined shape has an increase in thickness ranging from 0.1 to 2 mm.

12. The device according to claim 11, wherein the increase in thickness ranges from 0.4 to 1.6 mm.

13. The device according to claim 1, wherein the device is made of silicone according to the standard NFL 17 153.

14. The device according to claim 1, wherein the device is made of titanium or stainless steel.

* * * * *